(12) United States Patent
Lin

(10) Patent No.: US 7,577,458 B2
(45) Date of Patent: Aug. 18, 2009

(54) LCD DISPLAY ON WIRELESS ROUTER

(75) Inventor: Frank Lin, Diamond Bar, CA (US)

(73) Assignee: Cisco Technology, Inc., San Jose, CA (US)

( * ) Notice: Subject to any disclaimer, the term of this patent is extended or adjusted under 35 U.S.C. 154(b) by 516 days.

(21) Appl. No.: 11/046,625

(22) Filed: Jan. 30, 2005

(65) Prior Publication Data

US 2006/0187890 A1  Aug. 24, 2006

(51) Int. Cl.
*H04M 1/00* (2006.01)
(52) U.S. Cl. .................... 455/550.1; 455/411; 455/566; 370/338; 713/189
(58) Field of Classification Search ................. 370/338, 370/328, 315; 455/550.1, 566, 412.1, 420, 455/411; 709/220; 345/2.3; 713/201, 155, 713/189
See application file for complete search history.

(56) References Cited

U.S. PATENT DOCUMENTS

| | | | |
|---|---|---|---|
| 2004/0003285 A1* | 1/2004 | Whelan et al. | 713/201 |
| 2004/0218544 A1* | 11/2004 | Lee | 370/252 |
| 2005/0050318 A1* | 3/2005 | Alone et al. | 713/155 |
| 2005/0108557 A1* | 5/2005 | Kayo et al. | 713/189 |
| 2005/0148326 A1* | 7/2005 | Nogawa et al. | 455/420 |
| 2005/0201557 A1* | 9/2005 | Ishidoshiro | 380/44 |
| 2005/0262223 A1* | 11/2005 | Kimura | 709/220 |
| 2006/0028398 A1* | 2/2006 | Willmore | 345/2.3 |

* cited by examiner

*Primary Examiner*—Danh C Le
(74) *Attorney, Agent, or Firm*—Haynes and Boone, LLP.

(57) ABSTRACT

A device, such as an access point or router, in a wireless network includes a user-readable visual display that displays information about the network, such as the number of users, the identities of the users, the type of WAN connection, the channel, and other network information.

23 Claims, 2 Drawing Sheets

LCD DISPLAY ON WIRELESS ROUTER

BACKGROUND

1. Field of Invention

The present invention relates generally routers and access points, and more to such devices having a display.

2. Related Art

Wireless local area networks (WLANs) are becoming more and more popular. One reason is that wireless users have greater mobility in using the wireless devices, such as laptops, to communicate with stationary base stations or wireless routers or access points (APs). This then allows the wireless device to communicate with an external network, such as the Internet. The user is free to move the wireless device from network to network or within a local area network, without the inconvenience of connecting cables. However, one disadvantage of wireless devices is that communication through a wireless medium is less secure than through a wired connection. The wireless medium allows easier access to signals propagating through the medium. As a result, signals carrying restricted or confidential information, such as a user's personal data or a network's configuration parameters, are more easily intercepted by unauthorized users. With this information, the unauthorized user can gain access to the network, access personal information, use the network services, and possibly disrupt network communication.

In a wireless network, routers and access points (APs) enable wireless users, such as laptops with a wireless network PC card or a wireless adapter, to connect to the Internet or a WAN. Routers and APs allow more than one wireless device to share a single connection to the network at any given time. However, as discussed above, one or more users may be unauthorized. Conventional routers and APs typically include a row, column, or array of LEDs on the upper or front panel. The LEDs indicate a variety of events, such as "Power On", successful connection to a device on through one of its ports, intermittent connection due to collisions, successful connection between the AP/router and a broadband device or network, AP/router sending or receiving data, and AP/router in a diagnostic mode.

A lit or blinking LED could indicate that one or more users is accessing or using the network. However, many times those users may be unauthorized. With conventional routers and APs, authorized users may not be able to easily detect an unauthorized user on the network since the only visual display on the device is usually just an array or row of LEDs. Further, many wireless network users do not have the requisite knowledge to detect unauthorized users just from the LED display. Because more and more users are utilizing wireless networks and hackers are becoming more and more sophisticated, it would be desirable to be able to detect unauthorized usage so that the network user or administrator can take necessary action, such as enabling security or changing security settings.

Therefore, there is a need for a device in a wireless system, such as a router or AP, that allows a user to easily identify when unauthorized users are on the network.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

According to one aspect of the present invention, a device in a wireless network, such as a router or an access point (AP), includes a visual display that provides the user specific network information, such as the number of users currently connected to the device. A suitable device is a wireless-G broadband router from Linksys®.

Figure 1:
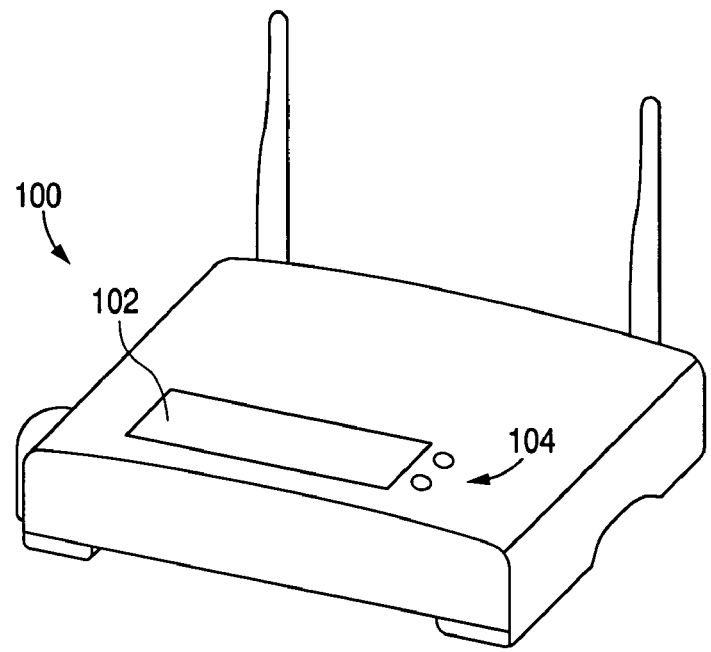
FIG. 1 shows a wireless router with an LCD display according to one embodiment of the invention.

FIG. 1 shows a wireless router 100 according to one embodiment of the present invention. Router 100, which allows multiple wireless devices to use one Internet connection, includes a visual display 102 on a top portion of the router. Other locations may also be suitable for display 102, which may depend on the shape and size of the router. Visual display 102 can be an LCD display or other type of display that can provide visually readable information, such as text, to the user. Router 100 also includes control buttons 104 that enable the user to scroll to specific types of information, such as number of users currently connected to the router. Other types of information include the MAC ID of the devices, such as PCs, connected the type of WAN internet connection, e.g., DHCP, Static IP, PPPOE, and PPTP, the network name SSID, the security encryption method being used, the wireless network mode, e.g., mixed, 802.11g only, 802.11b only), the wireless channel, the current firmware loaded on the device, including time and date, and the status of the phone service as well as the phone number assigned to that port if the router is implemented on a VoIP router. Those skilled in the art will appreciate that other information may also be displayed.

Control buttons 104 allow the user to scroll up or down to display the desired information. In other embodiments, one or more control buttons 104 may be used to access an on-screen menu, which would then allow the user to select the desired display information. The information could be displayed as text and/or numbers, depending on design. For example, a simple display may simply display numbers, which would correspond to fixed headings or descriptors along the boundary of the display. More detailed displays would include both text and numbers.

Figure 2:
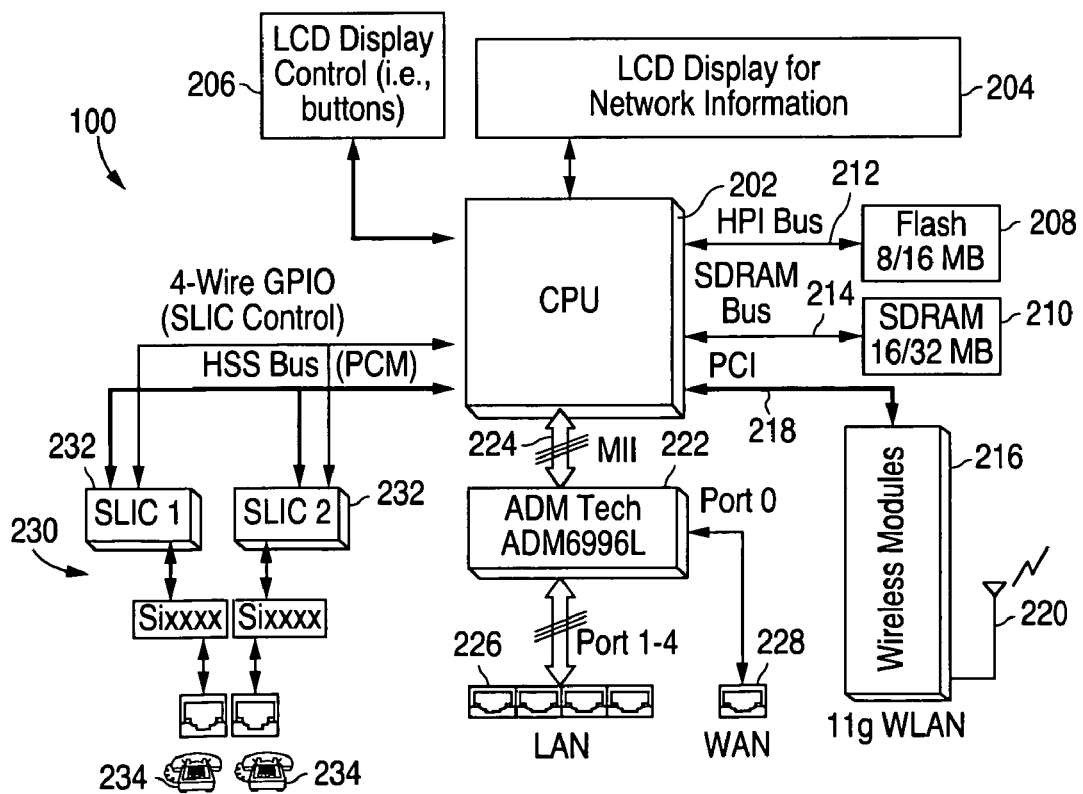
FIG. 2 is a block diagram of the router of FIG. 1.

FIG. 2 is a block diagram of router 100 according to one embodiment. Router 100 includes a central processing unit (CPU) 202 coupled to an LCD display 204 and a display controller 206, such as buttons. CPU 202 is the engine that runs the software application, operating system, and driver.

CPU 202 is coupled to one or more memories, such as a flash memory 208 and a synchronous DRAM (SDRAM) 210. Flash memory 208 or other non-volatile memory is used for storing software, application, and data, so that data will be preserved after power off the device. Flash memory 208 can include BIOS chip, compact flash, memory stick, PCMCIA Type I and Type II memory cards (used as solid-state disks in laptops), and memory cards. SDRAM 210 or other volatile Random Access Memory (RAM) is used for faster access and runtime process. The software and Operating System reside in flash memory 208 and will be uncompressed and moved to SDRAM 210 for CPU 202 to access and execute. The data will be saved to SDRAM 210 first for buffering and to be saved into flash memory 208. Transfer of data and information to and from memory 208 and memory 210 can be by bi-directional buses, such as an HPI bus 212 and an SDRAM bus 214.

CPU 202 is also coupled to a wireless module 216 via a PCI bus 218. Wireless module 216 includes one or more antennas 220, which receives and/or transmits information from the wireless network into or from the router for processing by CPU 202. The driver and the control software of wireless module 216 is loaded into CPU 202, which allows communication with other wireless devices on the network.

An Ethernet switch 222 is connected to CPU 202, such as by a Media Independent Interface (MII) 224. Ethernet switch 222 directs wired data traffic to different ports or to CPU 202 to process and forward to different physical interfaces, such as wireless. Ethernet switch 222 also separates a Local Area Network (LAN) 226 or a Wide Area Network (WAN) 228 and forwards to a home network or to a connection to the Internet. In this embodiment, router 100 has four LAN ports and one WAN port.

CPU 202 is also coupled to a Voice-Over-IP (VoIP) module 230 by wired or bus connections for bi-directional transfer of signals. One or more Subscriber Line Interface Circuits (SLIC) 232 transform a telephone signal from telephones 234 to an analog voice signal. The analog voice signal then passes to either an encoder/decoder (CODEC) hardware or a software CODEC running on CPU 202 to convert to digital signal. CPU 202 then directs the digital voice data to different physical interfaces, such as wireless, LAN, or WAN.

Thus, CPU 202 is able to retrieve network information from a variety of sources, which it can then process and display on LCD display 204. The LEDs on device 204 can be controlled by software through General Purpose Input/Output (GPIO) available on CPU 202. Buttons on display control 206 can be pressed (or another way of selecting) to send signals to CPU 202, which causes CPU 202 to access the desired information. CPU 202 then transmits that information to LCD display 204, which includes drivers and other circuitry for converting the signals to a visual display. LCD display 204 displays the desired information on its screen.

Depending on the information displayed, the user can take appropriate action. For example, if the user sees that there are three users on the network and the user is the only one authorized on the network, the user can install a security protocol or change security settings. If the user sees a MAC ID of an unauthorized user, a button can be pushed to send the unauthorized ID to a wireless MAC filter list.

In one embodiment, information for the visual display is obtained through the router's DHCP clients table. A DHCP (Dynamic Host Configuration Protocol) server (either a separate device or a router function) assigns an IP address to devices communicating with the network. The DHCP table compiles a list of active IP addresses associated with the network, along with the client hostname and MAC address of the device. Other information may also be stored for different devices or applications. Thus, if one or more devices, such as a laptop, is communicating on the network, the DHCP table enables the CPU to access information on the device, which can then be shown to the user on the visual display. In other embodiments, different information contained within the router may be accessed by the device CPU and visually shown on the router's display.

Figure 3:
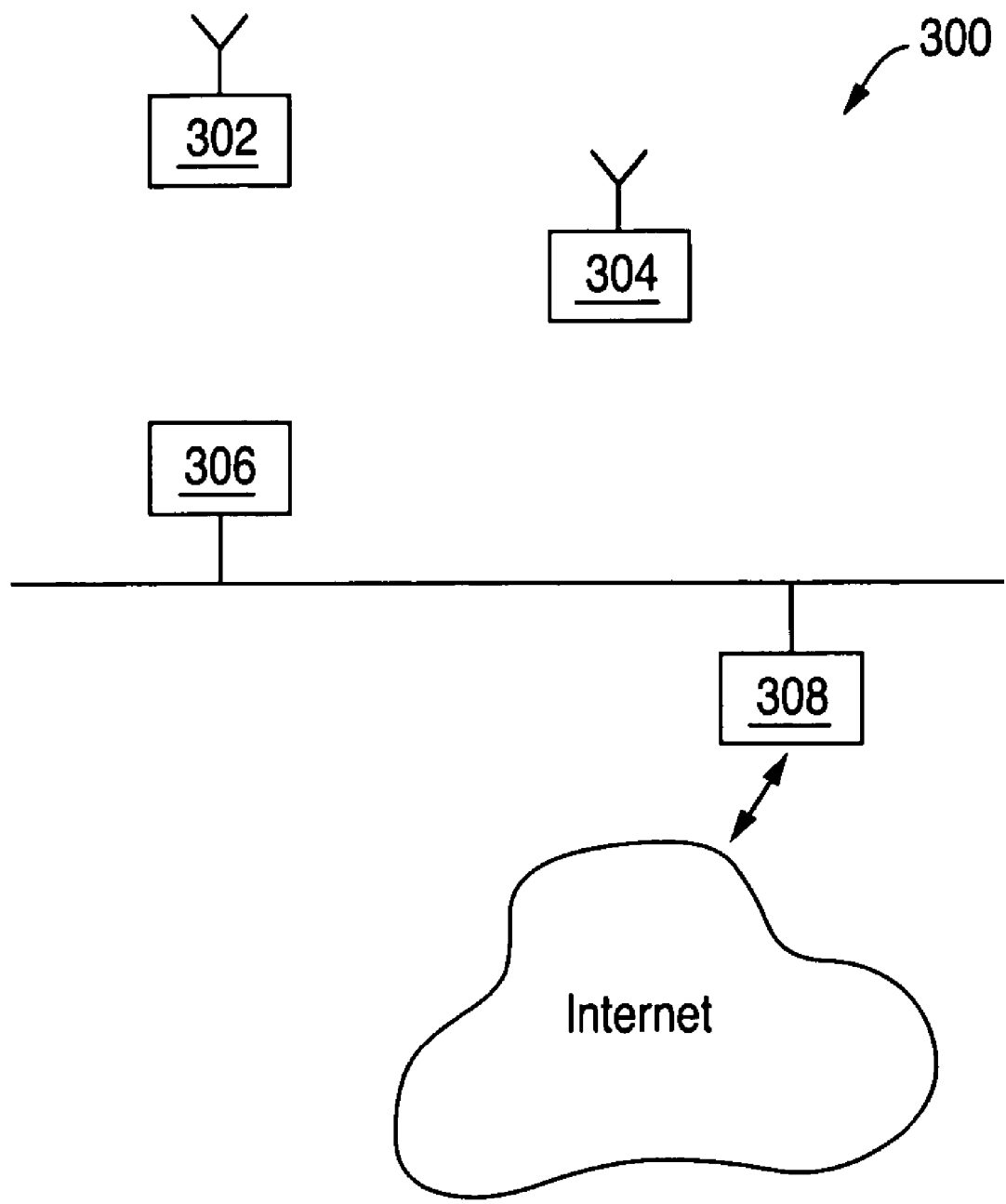
FIG. 3 is a block diagram of a wireless network according to one embodiment for utilizing a router of the present invention.

FIG. 3 shows a block diagram of a wireless network 300 according to one embodiment for utilizing the router discussed above. Network 300 includes a first and second wireless client device or station (STA) 302 and 304, an access point (AP) 306 connected to a wired network, and a router 308 connected to the AP via the wired network. AP 306 and router 308 enable STAs 302 and 304, along with other stations that may enter and associate with network 300, to access other networks, such as the Internet, through the network.

Network 300 can be of different types of wireless LANs, including those conforming to the IEEE 802.11 standard, such as 802.11(a), 802.11(b), and 802.11(g). 802.11 conformant networks typically include a plurality of Basic Service Sets (BSSs), with each BSS capable of having multiple wireless stations and an access point. The stations can be any device that can function within the 802.11 protocol, e.g., with physical layer (PHY) interfaces to the wireless medium and Media Access Control (MAC) that utilizes Carrier Sense Multiple Access with Collision Avoidance (CSMA/CA) protocol. Examples of suitable devices include laptop PCs, desktop computers, and handheld devices, such as PDAs. These devices can be mobile, portable, or stationary. AP and router devices also contain 802.11 conformant MAC and PHY interface to the wireless medium and provide access to a distribution system for associated stations.

According to one embodiment, first STA 302 is an authorized user communicating within the network through AP 306 and router 308. Second STA 304 is an unauthorized user that has obtained access to the network and is also communicating through AP 306 and router 308. With conventional routers and APs, the authorized user may only see that the router or AP is in use and at least one device is communicating in the network, such as with lit or blinking LEDs. In this situation, the authorized user may not even know that someone else has accessed the network. In another situation, only first STA 302, which is an unauthorized user, is using the network. In this case, the authorized network user will see that the network is being used (again such as with a lit or blinking LED), but may not be sure whether it is by an unauthorized user or an authorized user at another location. With the present invention, the user can access the appropriate display on the router display screen and see whether there are any unauthorized users on the network.

Thus, the present invention allows users to easily access (by reading a display) information from the AP or router, which would then enable the user to take appropriate action.

The invention is suitable for different types of wireless LANs, including those conforming to the IEEE 802.11 standard, such as 802.11(a), 802.11(b), and the working drafts such as 802.11(g) and 802.11(e) with APs having extended capability to support channel loading measurement.

Having thus described embodiments of the present invention, persons skilled in the art will recognize that changes may be made in form and detail without departing from the scope of the invention. For example, the above description detailed a router with an LCD display. However, other devices, such as APs, and other displays may also be suitable with the present invention. Thus the invention is limited only by the following claims.

What is claimed is:

1. A device for facilitating communication in a wireless network with at least one wireless station, the device comprising:
    an antenna configured to receive signals from the wireless station;
    a central processing unit (CPU) coupled to the antenna;
    a visual display coupled to the CPU and configured to receive information from the CPU about the wireless station and display information about unauthorized users in a user-readable format; and
    a controller coupled to the CPU, the controller adapted to select the type of information to be displayed based on a user input and to enable a user to transmit information from the device in response to the information about unauthorized users.

2. The device of claim 1, wherein the user-readable format is alphabetic.

3. The device of claim 1, wherein the user-readable format is numeric.

4. The device of claim 1, wherein the user-readable format is alphanumeric.

5. The device of claim 1, wherein the visual display is an LCD display.

6. The device of claim 1, wherein the information is the number of users on the network.

7. The device of claim 1, wherein the information is an identifier of all users on the network.

8. The device of claim 7, wherein the identifier is a MAC address.

9. The device of claim 1, wherein the device is an access point.

10. The device of claim 1, wherein the device is a router.

11. The device of claim 1, wherein the controller comprises at least one button.

12. The device of claim 11, wherein the at least one button enables the user to scroll through the different types of information.

13. The device of claim 1, further comprises a button for the user to press to send the information.

14. The device of claim 1, wherein the information is a MAC ID for an unauthorized user and wherein MAC ID is sent to a MAC filter list.

15. A method of communicating network information in a wireless network comprising:
   establishing a connection between a wireless station and a device on the network;
   selecting, based on a user pressing a button, the type of information to be displayed about unauthorized users;
   displaying user-readable information on the device; and
   transmitting information from the device in response to information about the unauthorized users based on an input from the user.

16. The method of claim 15, wherein the device is an access point.

17. The method of claim 15, wherein the device is a router.

18. The method of claim 15, wherein the information is the number of users on the network.

19. The method of claim 15, wherein the information is an identifier of all users on the network.

20. The method of claim 15, wherein the displaying is on an LCD display.

21. The method of claim 15, wherein the transmitting comprises pressing a button.

22. The method of claim 15, wherein the information is a MAC ID for an unauthorized user and wherein MAC ID is sent to a MAC filter list.

23. A device for facilitating communication in a wireless network, comprising:
   means for establishing a connection between a wireless station and a device on the network;
   means for selecting from different types of information about unauthorized users to be displayed based on a user input;
   means for displaying user-readable information on the device; and
   means for transmitting information from the device in response to information about the unauthorized users based on an input from the user.

* * * * *